Figure 13:
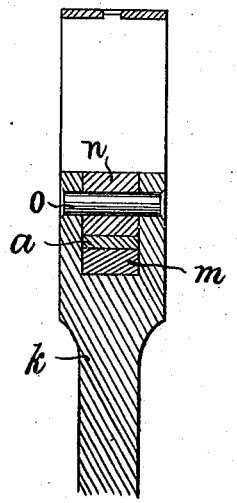

No. 881,409. PATENTED MAR. 10, 1908.
A. JUDE.
GUIDE BLADE AND VANE FOR TURBINES.
APPLICATION FILED AUG. 28, 1906.
5 SHEETS—SHEET 1.
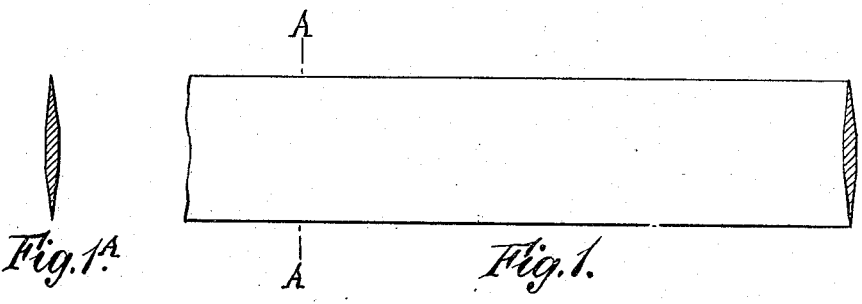
Fig.1.ᴬ   Fig.1.
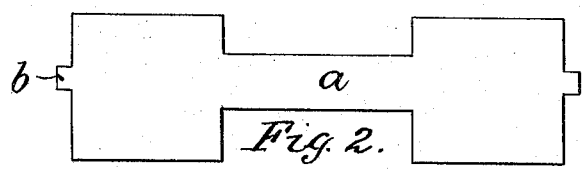
Fig. 2.
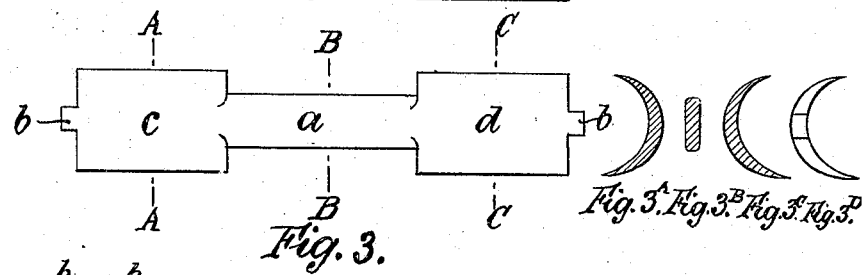
Fig. 3.   Fig. 3.ᴬ Fig. 3.ᴮ Fig. 3.ᶜ Fig. 3.ᴰ
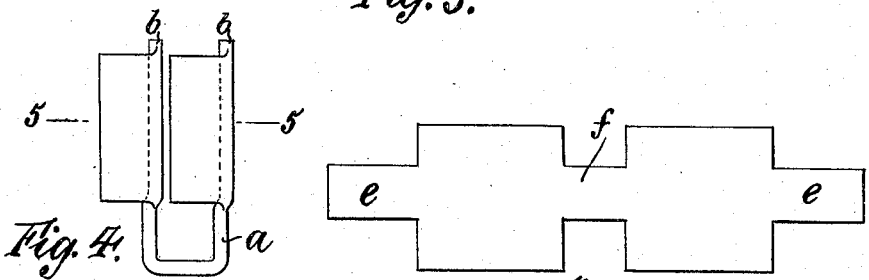
Fig. 4.   Fig. 6.
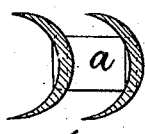
Fig. 5.
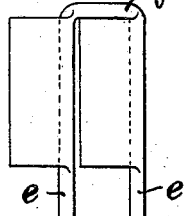
Fig. 7.
WITNESSES
M Petit
Ed...
INVENTOR
Alexander Jude
B Richards & Co
ATT'YS.

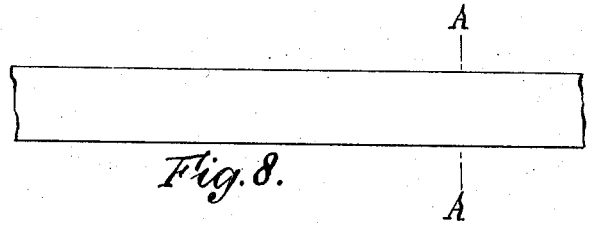
Fig. 8.
Fig. 8ᴬ.
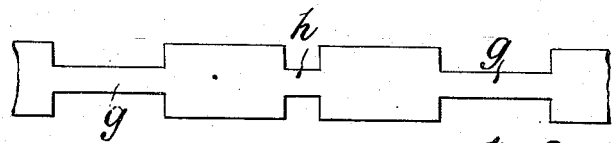
Fig. 9.
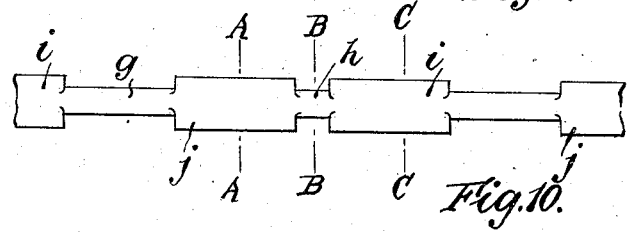
Fig. 10.
Fig. 10ᴬ. Fig. 10ᴮ. Fig. 10ᶜ.
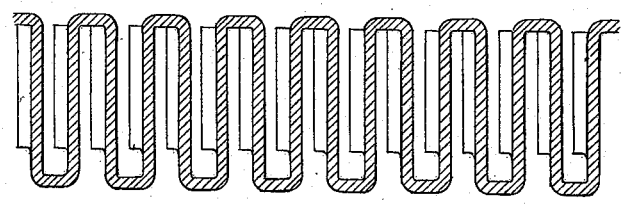
Fig. 11.
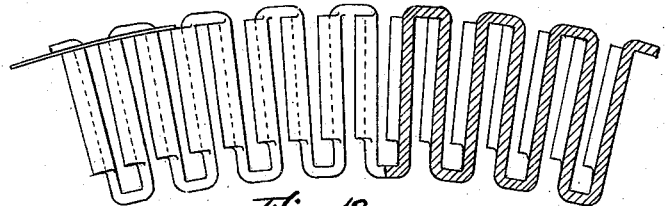
Fig. 12.

No. 881,409.  
A. JUDE.  
GUIDE BLADE AND VANE FOR TURBINES.  
APPLICATION FILED AUG. 28, 1906.  
PATENTED MAR. 10, 1908.  
5 SHEETS—SHEET 4.
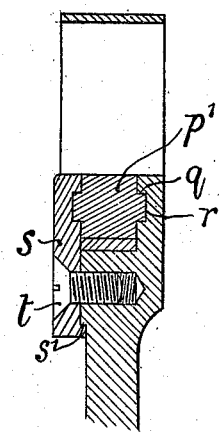
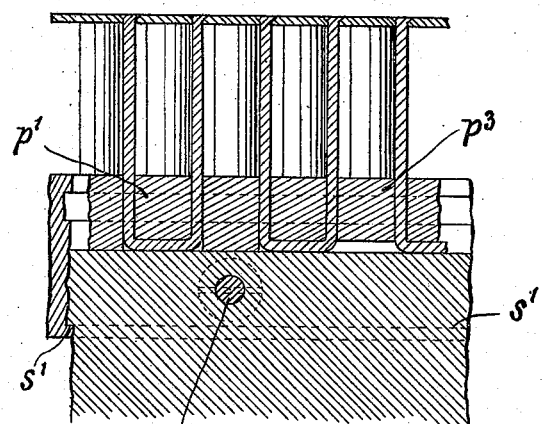
Fig. 18.   Fig. 19.
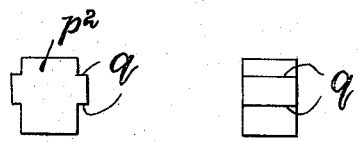
Fig. 18ᴬ.   Fig. 19ᴬ.   Fig. 19ᴮ.
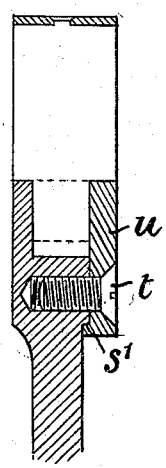
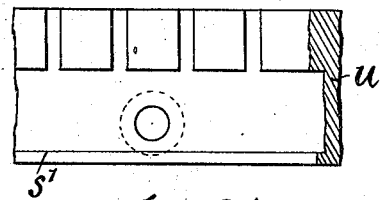
Fig. 20.   Fig. 21.
WITNESSES  
INVENTOR  
Alexander Jude  
By Richards & Geo  
ATTYS.

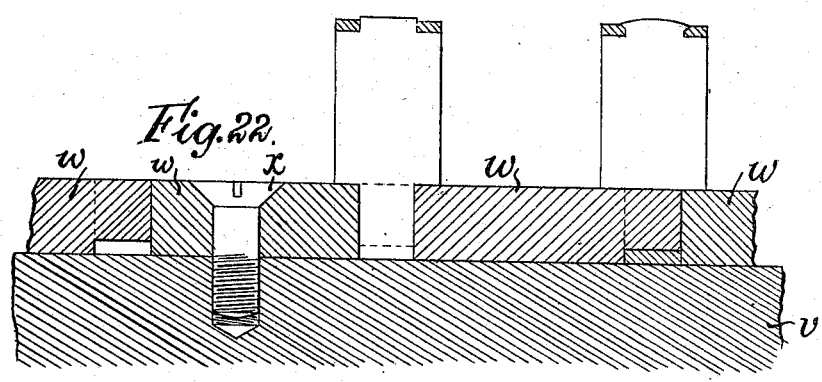
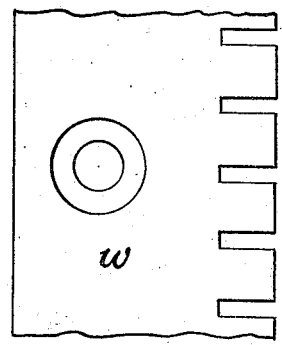
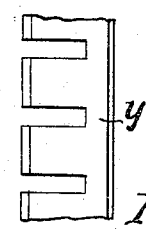
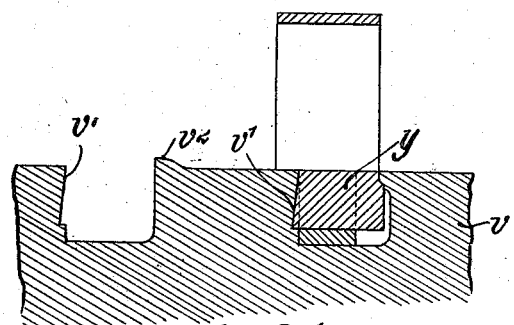
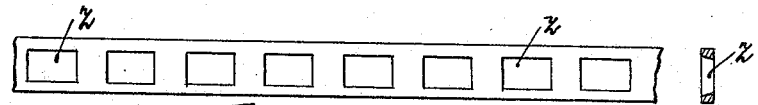

UNITED STATES PATENT OFFICE.

ALEXANDER JUDE, OF BIRMINGHAM, ENGLAND, ASSIGNOR TO BELLISS & MORCOM LIMITED, OF BIRMINGHAM, ENGLAND.

GUIDE-BLADE AND VANE FOR TURBINES.

No. 881,409.   Specification of Letters Patent.   Patented March 10, 1908.

Application filed August 28, 1906. Serial No. 332,351.

*To all whom it may concern:*

Be it known that I, ALEXANDER JUDE, subject of King of Great Britain, residing at Ledsam Street Works, Birmingham, in the county of Warwick, England, have invented new and useful Improvements in Guide-Blades and Vanes for Turbines, of which the following is a specification.

This invention relates to improved methods of construction of the guide blades and vanes of turbines and to improved means whereby they are assembled in a secure and rigid manner to compose the stator and the rotor respectively.

The important novel feature which is common to all the constructions described and illustrated in the present specification is the formation of two or more consecutive guide blades or vanes in one piece whereby each lends strength and rigidity to the others which are integral with it, and, by the forked form of the twin shanks, provide easy means for getting a secure holdfast to the stator and rotor respectively, by a piece interposed within the branches of the fork:—also the constructions, the details of which are varied, all conform to the condition that the component parts can be machined from a strip of uniform section by a repetition process involving comparatively small cost and providing great uniformity.

The accompanying drawings show the form and fixing as adapted to the external periphery of a cylindrical disk or drum which, in general, would constitute the rotor, the attached portions, in these instances, being vanes:—But, such a disk or drum is not necessarily the rotor. It may be the stator, in which case the attachments would be distinguished by the term guide-blades.

By an obvious inversion, the methods of construction shown can all be adapted for fixing to the internal surface of a drum, in which case, the attached parts would, in general, be the guide-blades of the stator, though they may be the vanes of the rotor.

Referring to the accompanying drawings:—

Figures 1-5 illustrate successive stages in the formation of twin guide-blades and vanes according to one process comprised in this invention. Figs. 6 and 7 show a modified method of twin construction. Figs. 8-12 illustrate successive stages in the formation of guide-blades and vanes by which any desired plurality may be made integral with each other. Figs. 13-24$^B$ show various methods of securing to the stator or rotor the guide-blades or vanes respectively the forms of which are shown in Figs. 1-12. Figs. 25 & 25$^A$ show a form of shrouding adapted to the guide-blades or vanes of Figs. 6-12.

In Figs. 1-5, Figs. 1 and 1$^A$ show the form of a strip, rolled or otherwise made, which is adapted to the formation of guide-blades or vanes according to this invention, Fig. 1$^A$ being a section at A—A in Fig. 1.

Fig. 2 shows a piece, severed from the strip of length sufficient to form two guide-blades or vanes, diminished in width in the central part $a$ and still more so for a short portion at each end $b$, these end lugs $b$ being destined to effect a riveted attachment to the shrouding. According to the figure the narrowed portion $a$ is not central relatively to the middle line of the strip, being made thus to enable the front and tail edges of the guide-blades or vanes to differ from one another.

Figs. 3, 3$^A$, 3$^B$, 3$^C$ and 3$^D$ show the result of bending the wide portions of Fig. 2 to the shape required to form the guide-blade or vane surfaces, Figs. 3$^A$, 3$^B$ and 3$^C$ being sections at A, B and C respectively, marked on Fig. 3, and Fig. 3$^D$ showing an end view from which it will be observed that one surface $c$, as viewed in plan, is convex and the other $d$ is concave. After this operation the central portion $a$ is bent as shown in Figs. 4 and 5, Fig. 5 being a section through the line 5—5— of Fig. 4. After being thus bent the concavities of both surfaces will face the same way. The part $a$ will form a forked shank and provide the means of attachment to the stator or rotor by interposing between the two branches of the fork a retaining block, as will be presently explained. By closing together slightly the ends $b$ $b$, or alternatively by slightly widening the distance apart, the guide-blades or vanes can be adapted to be assembled radially within, or on the outside, respectively, of a drum.

Figs. 6 and 7 show an alternative method of cutting and bending a portion of the strip for the purpose of twin formation. In this case the bent extremities of the narrowed end portions $e$ $e$ are employed for securing the blades or vanes to the stator and rotor respectively the central narrow portion $f$ being secured to the shrouding in a manner to be presently explained.

In Figs. 8–12 are shown stages in the formation of guide-blades or vanes in which any desired number are made integral with one another.

Fig. 8$^A$ is a section through A—A in Fig. 8.

Fig. 9 shows the strip of Fig. 8 narrowed at intervals to form alternatively the shanks and shroud attachments, the parts lettered $g$ being employed for the shanks and the parts $h$ for the shroud attachment.

Figs. 10, 10$^A$, 10$^B$ and 10$^C$ show the result of bending the alternative portions $i\ j$ which are left undiminished in width to constitute the blade or vane surfaces, the three latter figures being sections at A—A, B—B and C—C respectively. Portions $i$ are made concave and portions $j$ convex as viewed in plan. After rounding the surfaces $i\ j$, as indicated, the strip is bent as shown in Fig. 11 or 12.

As shown in Fig. 11 the blade or vane surfaces are parallel to one another and to adapt such blades or vanes to the interior or exterior of a drum two consecutive ones, in pairs, will be required to remain parallel to one another, consecutive pairs being slightly inclined to one another. In order that every guide-blade or vane may be radial when secured to a wheel or drum, as indicated in Fig. 12, it will be necessary to so bend the strip that the pitch at the inner end of the shanks is suitably proportioned to the pitch at the shrouding to suit the radius of the drum or disk to which the blades or vanes are to be secured. It will be observed that, if the bent continuous strip shown in Fig. 11, be parted at the middle of the shank portions $g$, a number of pairs of blades or vanes would result of the twin form shown in Fig. 7.

Figure 14:
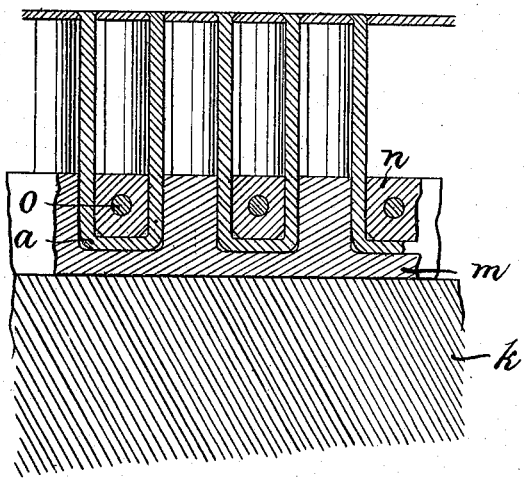

Figs. 13 and 14 show one method of securely fastening the blades or vanes, which are constructed according to Figs. 1–5, to the outside of a disk. In the periphery of the disk $k$ a groove is turned which is adapted to be occupied by a notched filling piece $m$ in the notches of which the shanks $a$ are inserted, blocks $n$ being interposed in the hollow of the forked shank. By means of pins $o$ which penetrate the blocks $n$ and the sides of the groove of the disk $k$, the ends of which are riveted, the blades or vanes are securely fastened.

Figure 15:
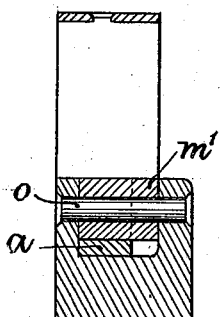
Figure 16:
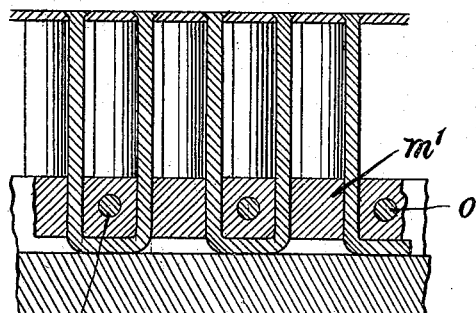
Figure 17:
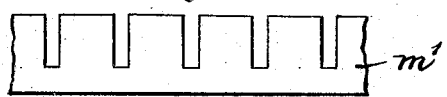

Figs. 15, 16 and 17 show how, by turning the filling piece, indicated by $m^1$, on its side, the notches being cut on one side of the segments of a ring, shown in part plan in Fig. 17, the use of detached blocks $n$ can be dispensed with. In this case alternate portions of the filling piece $m^1$ serve as distance pieces between the pairs of blades or vanes, the other alternate portions, which are penetrated by pins $o$, serving the purpose of the interposed retaining blocks $u$.

The principle of detention by pieces interposed in the fork formed by the twin shanks may be embodied in other forms of construction, as for example that shown in Figs. 18–19$^B$:—In this the filling piece is composed of a number of separate blocks one half of the number of which, indicated by $p'$—$p'$, have a section shown by $p'$ Fig. 18, these being interposed in the fork formed by the shanks of the twin blades or vanes. The other half of the number which serves as entrance pieces between the pairs of blades or vanes may have a modified section as shown at $p^2$ Fig. 19$^A$, though they may be identical with the blocks $p'$ as shown at $p^3$ Fig. 19. These blocks are retained by shoulders $q$ formed thereon which, on one side, fit into a groove $r$ provided in the stator or rotor and on the other side the shoulders fit into a groove formed in a junk-ring $s$ which may be formed in segments and secured by screws $t$ a centering ring $s^1$ helping to fortify the attachment and diminish or eliminate the shearing force on the screws $t$ due to centrifugal force in the case of the rotor.

Figs. 20 and 21 show a modified construction according to which the retaining and distance blocks of Figs. 18–19$^B$ are made integral with the junk-ring $u$ and alternatively to this, these pieces may be made integral with the disk instead of the junk-ring.

In the cases in which the blades or vanes are required to be fastened to a drum and not to a thin edged disk a form of construction shown in Figs. 22 and 23 may be adopted. This contains the same principle of retention by pieces interposed in the fork of the twin shanks. In this the drum $v$ is surrounded by or, if a hollow drum, is lined by, a series of rings $w$ shown in section in Fig. 22 and a part developed in Fig. 23. Notches are cut in one edge of the ring to receive the twin shanks as shown and by the butting of the edge of the next adjacent ring the inclosure of the shanks is completed. At the end of the drum the inclosure is completed by a fixed collar integral with the drum or by a junk-ring. The rings $w$ may be secured by screws $x$ and may be formed in segments. Alternatively to the last mentioned construction the forked twin shanks may be secured to a drum $v$ by turning grooves therein of a section shown in Fig. 24, one side $v^1$ thereof being undercut and a protruding ring $v^2$ being formed on the edge of the other side which, after the assembly of the blades or vanes can be fullered down. A filling piece $y$ in the form of a ring with notches cut on one side as shown in part development in Fig. 24$^B$ and in section in Fig. 24$^A$ serves to provide the required distance pieces between the pairs and the retaining pieces interposed in the hollow of the fork of the combined twin blades or shanks. By the beveled edge on one side and the fullering operation on the other the filling piece *y* made in segments is securely held and thereby the blades or vanes.

Fig. 25 in development and 25ᴬ in section show a form of shrouding suitable for use with blades or vanes formed as shown in Figs. 6 and 7 or as shown in Figs. 8-12. The rectangular orifices *z* are made to fit the portion *f* of Figs. 6 and 7 or the portion *h* of Figs. 9-12 and the sides of the orifices are countersunk. The portions *f* and *h* being composed of thicker material than the shrouding will permit the connection to be secured by riveting as shown in Fig. 22.

Claims:

1. For turbine motors, guide-blades of which a plurality are formed integrally in one piece from a strip and have a narrow connecting portion which extends tangentially relatively to the stator.

2. For turbine motors, vanes of which a plurality are formed integrally in one piece from a strip and have a narrow connecting portion which extends tangentially to the rotor.

3. For turbine motors, guide-blades of which a plurality are formed integrally in one piece from a strip and have a shank portion which extends tangentially relatively to the stator.

4. For turbine motors, vanes of which a plurality are formed integrally in one piece from a strip and having a shank portion which extends tangentially relatively to the rotor.

5. For turbine motors, guide-blades of which a plurality are formed integrally in one piece from a strip and have a shank portion which extends tangentially relatively to the stator, and retaining blocks adapted to fit between consecutive guide-blades and vanes, and be fastened to the stator and rotor respectively and inclose the said tangentially extending portion of the shank.

6. For turbine motors vanes of which a plurality are formed integrally in one piece from a strip and have a shank portion which extends tangentially relatively to the rotor and retaining blocks adapted to fit between consecutive vanes and be fastened to the rotor and inclose the said tangentially extending portion of the shank.

7. For turbine motors, guide-blades of which a plurality are formed integrally in one piece from a strip and have a shank portion which extends tangentially relatively to the stator, and retaining blocks adapted to fit between consecutive guide-blades, and be fastened to the stator and rotor respectively and inclose the said tangentially extending portion of the shank a plurality of the retaining blocks being formed integrally in one piece.

8. For turbine motors, vanes of which a plurality are formed integrally in one piece from a strip and have a shank portion which extends tangentially relatively to the rotor and retaining blocks adapted to fit between consecutive vanes and be fastened to the rotor and inclose the said tangentially extending portion of the shank, a plurality of the retaining blocks being formed integrally in one piece.

In testimony whereof I have signed my name to this specification in the presence of two subscribing witnesses.

ALEXANDER JUDE.

Witnesses:
WALTER CLOWES,
HAROLD CORBETT.